(12) United States Patent
Zhou et al.

(10) Patent No.: US 8,843,504 B2
(45) Date of Patent: Sep. 23, 2014

(54) METHOD AND SYSTEM FOR UPDATING IMAGES IN AN IMAGE DATABASE

(75) Inventors: Chunyi Zhou, Hangzhou (CN); Shengyu Yu, Hangzhou (CN); Dajiong Yue, Hangzhou (CN)

(73) Assignee: Alibaba Group Holding Limited (KY)

( * ) Notice: Subject to any disclaimer, the term of this patent is extended or adjusted under 35 U.S.C. 154(b) by 317 days.

(21) Appl. No.: 12/660,985

(22) Filed: Mar. 8, 2010

(65) Prior Publication Data

US 2010/0228722 A1    Sep. 9, 2010

(30) Foreign Application Priority Data

Mar. 9, 2009   (CN) .......................... 2009 1 0127225

(51) Int. Cl.
*G06F 17/00*   (2006.01)
*G06F 17/30*   (2006.01)

(52) U.S. Cl.
CPC ...... *G06F 17/3028* (2013.01); *G06F 17/30265* (2013.01); *G06F 17/30247* (2013.01)
USPC ............................ 707/755; 707/802; 707/706

(58) Field of Classification Search
USPC .................. 707/755, 802, 706, 711
See application file for complete search history.

(56) References Cited

U.S. PATENT DOCUMENTS

| | | |
|---|---|---|
| 5,873,080 A | 2/1999 | Coden et al. |
| 5,983,237 A | 11/1999 | Jain et al. |
| 6,084,595 A * | 7/2000 | Bach et al. ..................... 345/589 |
| 6,167,436 A | 12/2000 | Yamane et al. |
| 6,345,275 B2 | 2/2002 | Lee |
| 6,389,417 B1 | 5/2002 | Shin et al. |
| 6,563,959 B1 | 5/2003 | Troyanker |
| 6,704,466 B1 | 3/2004 | Yamamoto et al. |
| 6,999,959 B1 | 2/2006 | Lawrence et al. |
| 7,068,309 B2 | 6/2006 | Toyama et al. |
| 7,130,864 B2 | 10/2006 | Lin et al. |
| 7,412,478 B1 | 8/2008 | Caruso et al. |
| 7,644,107 B2 | 1/2010 | Neagovici-Negoescu et al. |
| 8,255,900 B2 * | 8/2012 | Nishibayashi et al. ....... 717/172 |
| 2003/0013951 A1 * | 1/2003 | Stefanescu et al. ........... 600/407 |
| 2005/0021512 A1 | 1/2005 | Koenig |
| 2006/0133699 A1 | 6/2006 | Widrow et al. |
| 2006/0190465 A1 | 8/2006 | Nakano et al. |
| 2006/0227992 A1 | 10/2006 | Rathus et al. |
| 2008/0065606 A1 | 3/2008 | Boys et al. |
| 2008/0086686 A1 | 4/2008 | Jing et al. |
| 2008/0212899 A1 | 9/2008 | Gokturk et al. |

FOREIGN PATENT DOCUMENTS

CN     1201267     5/2005

OTHER PUBLICATIONS

First Examination Report mailed Nov. 29, 2010 for Chinese Patent Application 200910127225.2.

* cited by examiner

*Primary Examiner* — Belix M Ortiz Ditren
(74) *Attorney, Agent, or Firm* — Van Pelt, Yi & James LLP (57) ABSTRACT

Updating images in an image database includes determining an updated image that is among a plurality of images in the image database, extracting a plurality of image features of the updated image and storing a plurality of image feature values that correspond to the plurality of image features, and associating the plurality of image features of the updated image with a search engine, including adding an array comprising the plurality of image feature values to an index of the search engine.

14 Claims, 12 Drawing Sheets

METHOD AND SYSTEM FOR UPDATING IMAGES IN AN IMAGE DATABASE

CROSS REFERENCE TO OTHER APPLICATIONS

This application claims priority to People's Republic of China Patent Application No. 200910127225.2 entitled METHOD, SERVER, AND SYSTEM FOR UPDATING IMAGES IN AN IMAGE DATABASE, filed Mar. 9, 2009, which is incorporated herein by reference for all purposes.

FIELD OF THE INVENTION

The present application relates to the image searching technology, and in particular, to a method and a system for updating images in an image database.

BACKGROUND OF THE INVENTION

Searching an image in an image database is usually carried out by two types of queries. The first type of query searches images based on a "search word" in a search request; i.e., searching for images whose filename in an image contains the "search word". The second type of query searches for images based on the similarity of content of the images in an image database and the image included in a search request. The searching technology used in this application refers to the second type of query.

Figure 1:
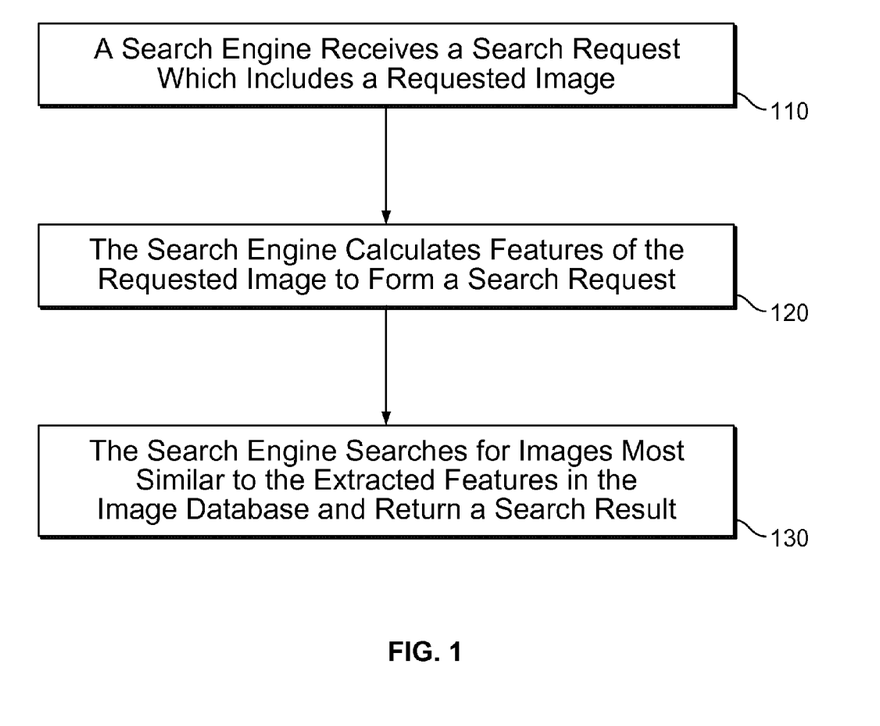
FIG. 1 is a flow chart illustrating a conventional image searching process.

The conventional image searching process is illustrated in FIG. 1. At 110, a search engine receives a search request which includes a requested image. At 120, the search engine calculates features of the requested image to form a search request. For example, the search engine may extract the shape features of the requested image. At 130, the search engine searches for images most similar to the extracted features in the image database and returns a search result. The features of all the images in the image database may be pre-calculated.

To provide the most up-to-date search result, the images in the image database may be updated periodically, and new images may be added to the database.

Conventionally, both existing images and newly added images in the image database are updated together; the index of those images is also updated. The update process is usually performed daily during the idlest period of a search engine. During this period, millions of existing and newly added images may be processed together. Since the number of existing images is often far more than the newly added images, updating the existing images and adding new images together may require excessively processing time. Therefore, a more efficient method and system for updating images in an image database is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 2A:
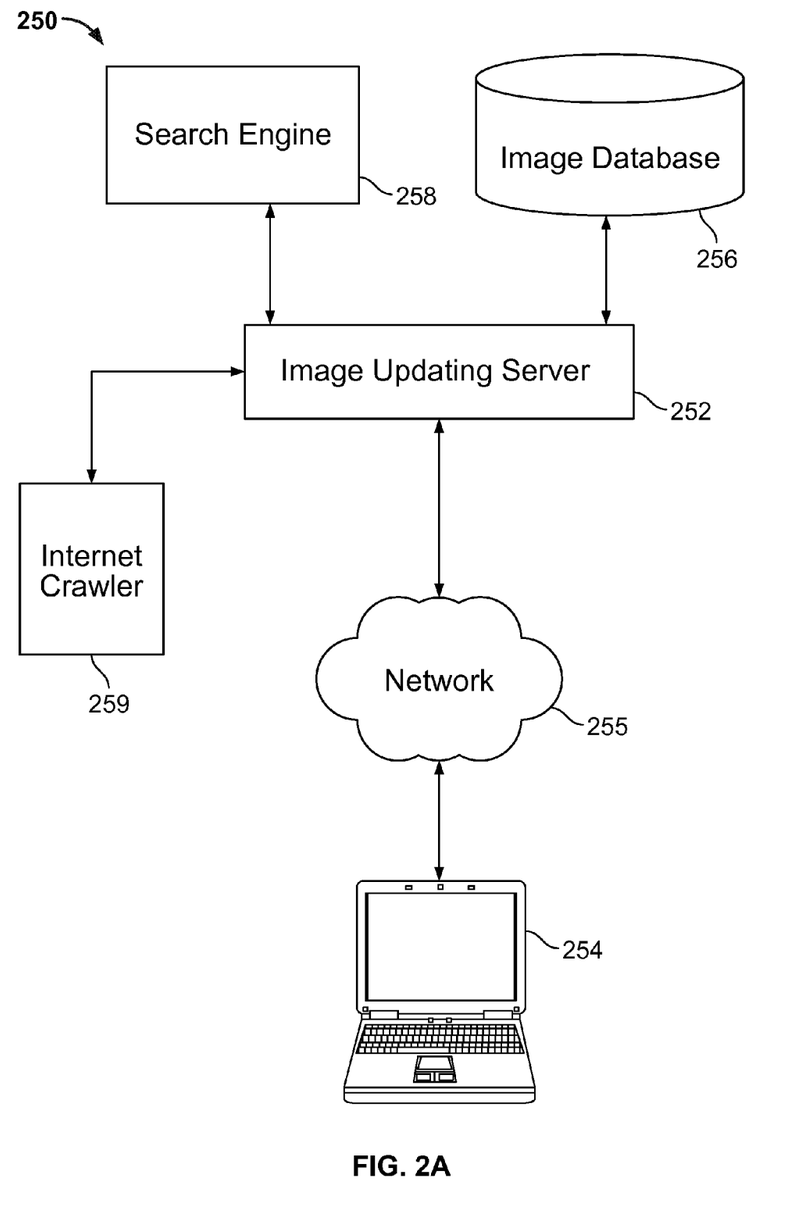
FIG. 2A is a block diagram illustrating an embodiment of an image updating system.

FIG. 2A is a block diagram illustrating an embodiment of an image updating system. In the example shown, image updating system 250 includes an image updating server 252, which in some embodiments includes one or more devices having one or more processors coupled to one or more memories. Image updating server 252 includes one or more interfaces configured to receive user inputs, for example, user inputs sent by client devices 254 over a network 255, which may be the Internet or other communications network. Examples of a communication interface include without limitation external connections, such as a port, cable, wire line, or wireless network interface card, etc., and internal connections such as a communication bus. The image updating server 252 may further receive updated images from an Internet Crawler 259. In some embodiments, the client device is a computing device such as a computer or mobile device with networking capacities. Image updating server 252 has access to image database 256 which stores images.

As described in greater detail below, upon receiving user input of an image request, the image updating server 252 processes the user input and extracts the features of the image. If the image is newly added or modified, an image update table and the image database 256 are updated. In some embodiments, the images to be updated are retrieved from the Internet using the Internet crawler technology. In some other embodiments, the features of the image are sent to a search engine 258, which locates and returns search results based on the requested image. In some embodiments, the search engine is configured to search for specific content stored in the image database 256 based on an index. The functions of the image search engine and the image updating server are combined in some embodiments; thus, the image updating server performs the updating process and returns the result to the user directly.

Figure 2B:
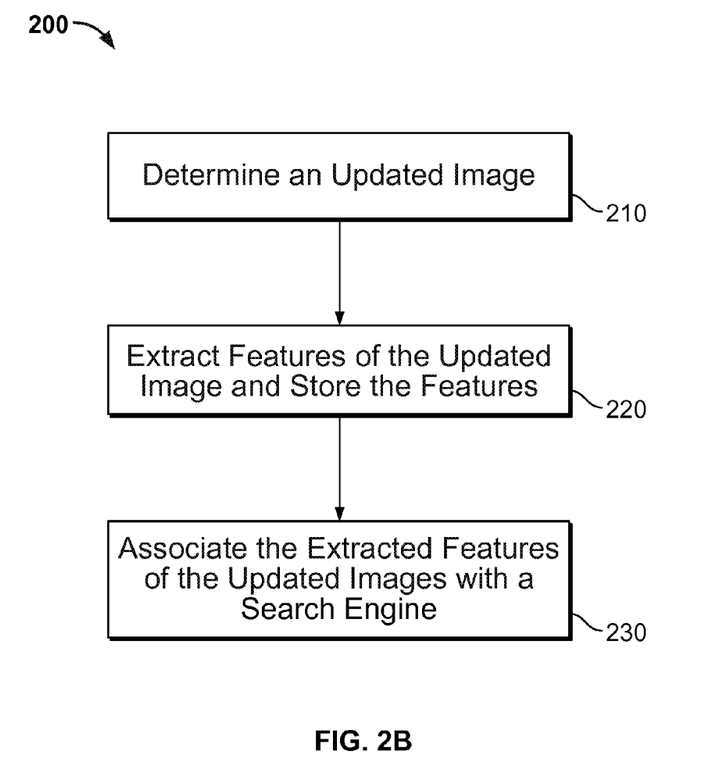
FIG. 2B is a flowchart illustrating an embodiment of an image updating process.

FIG. 2B is a flowchart of an embodiment of an image updating process. Process 200 may be performed on a system such as 250. At 210, an updated image is obtained. As used herein, an updated image refers to a newly added image or a modified image. In some embodiments, instead of updating all the images in an image database, only the newly added or modified images are processed. This step ensures that in order not to waste valuable computing resources, the existing images in the image database which do not have new updates are not processed. At 220, the features of the updated images are extracted and stored. At 230, the extracted features of the updated images are associated with a search engine.

Figure 2C:
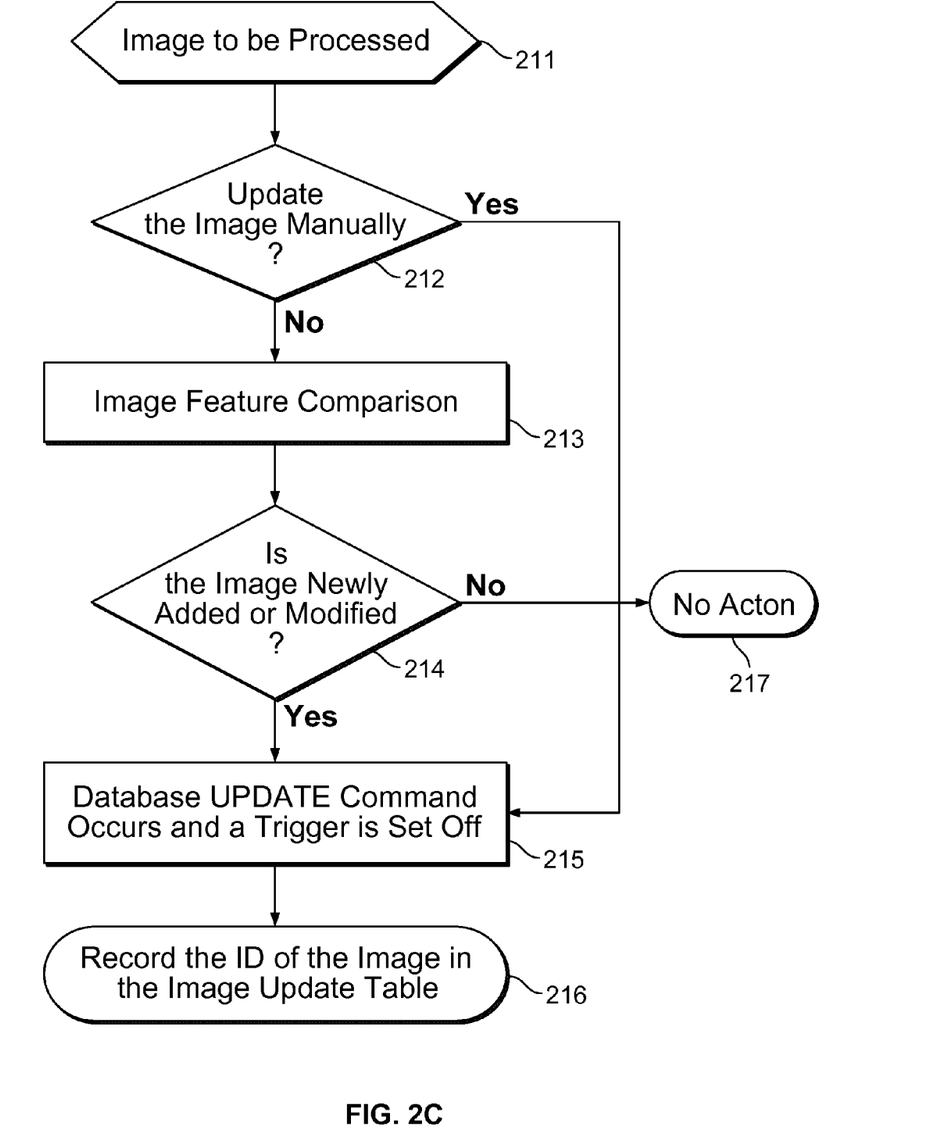
FIG. 2C is a flowchart illustrating an embodiment of a process to determine and process an updated image.

FIG. 2C is a flowchart illustrating an embodiment of determining and processing an updated image. In some embodiments, the updated image is obtained through an image update table. TABLE 1 below illustrates one embodiment of an image update table. For each image in the image database, the image update table records the image identifier (ID) associated with the image and the modification time of the image.

TABLE 1

Image Update Table

| Image ID | Modification Time |
|---|---|
| A1 | 2010-2-14 8:08:08 |
| A2 | 2010-2-14 18:00:00 |

At 211, an image to be processed is either requested from an end user, transferred from another image database or system, or obtained from an Internet crawler.

At 212, the image update server checks whether the image is requested to be manually recorded in an image update table. In some embodiments, an image is uploaded by a user terminal. The user may select the manner of uploading to be "newly added" or "modified" during the uploading. In an image database, a unique image ID is associated with each image in the database. If the manner of uploading is "newly added," the image database will assign a unique image ID to the newly added image when the image is recorded in the image database. If the manner of updating is "modified," the image database will keep the same image ID before recording the modified image.

In some embodiments, an image ready to be updated is retrieved from the Internet by an Internet crawler system. At 213, features of the retrieved image, such as source link address, source catalog, file name, file format, etc., are compared with the corresponding features of the existing images in the image database. At 214, if the result from the comparison shows that no existing image has the same features as the image to be updated, the image retrieved from the Internet is a newly added image. The image database will then assign a unique image ID to the retried image when the image is recorded in the image database. If the comparison result indicates that the image retrieved is a modified image, the image database will keep the same image ID associates with this retrieved image and will update only the change or modification accordingly.

At 215, to record the newly added or modified image in the image database, a database UPDATE command usually occurs concurrently in the database. In some embodiments, a database trigger is configured to detect the UPDATE command. Detection of the UPDATE command indicates that an update has occurred in the image database. Accordingly, the updated image ID is recorded in the image update table, and the updated image is obtained by checking the image update table.

A 217, if the image ready to be updated is neither new nor modified, no action needs to be done neither in the image update table or the image database.

At 220, values corresponding to features of an updated image are extracted and stored in an image feature table in the image database. In some embodiments, the extracted feature values may be represented by a multi-dimensional vector, for example, (P1, P2, . . . Pn). And the n-dimension vector may represent the shape features of an object in the updated image. In some embodiments, conventional image feature extraction techniques, such as Hough transformation are used. In an alternative embodiment, the following image feature extraction technique is used:

Step 1: Extract an image that includes an object from an original image.

Step 2: Fill in the margin of the extracted image with a single color as the background so that the image after filling forms a Minimal Square that covers the extracted image.

Step 3: Resize the Minimal Square into another square image having a first predetermined size; and the resized square image is divided into sub-image blocks having a second predetermined size.

Step 4: Compute luminosity derivatives of neighboring pixels in horizontal, vertical, positive 45°, and negative 45° directions for each of the sub-image blocks and obtain a quintuplet characteristic vector for each of the sub-image blocks based on the number of extrema of the derivatives in the four borders of the sub-image block.

Step 5: Compose a characteristic vector of the original image using the characteristic vectors of all the sub-image blocks;

In the image feature extraction technique above, edges of an object in the original image are obtained through the luminosity difference of pixels between the edges and the surrounding background. Therefore, the shape feature of the object in the original image can be calculated. Details of the alternative embodiments can be found in People's Republic of China Patent Application No. 200910007218.9, entitled METHOD AND SYSTEM FOR IMAGE FEATURE EXTRACTION, filed Feb. 13, 2009, which is incorporated herein by reference for all purposes, and U.S. patent application Ser. No. 12/658,471, entitled METHOD AND SYSTEM FOR IMAGE FEATURE EXTRACTION, filed Feb. 9, 2010, which is incorporated herein by reference for all purposes.

In some embodiments, an image feature table may be used for storing features of updated images. Table 3 is one embodiment of an image feature table.

TABLE 2

Image Update Table

| Image ID | Modification Time |
|---|---|
| A1 | 2009-1-1 18:00:00 |
| A2 | 2009-1-1 17:00:00 |
| ... | ... |

TABLE 3

Image Feature Table

| Image ID | Image Feature | Modification Time |
|---|---|---|
| A1 | (P11, P12, ..., P1n) | 2009-1-1 17:00:00 |
| A2 | (P21, P22, ..., P2n) | 2009-1-1 18:00:00 |
| ... | ... | ... |

In some embodiments, the first step of updating and storing features of images in the image database is to compare the modification time corresponding to a same image ID in the image update table and the image feature table according to a preset schedule.

If no modification time is associated with the image ID in the image feature table, then the characteristic value vector of the image corresponding to the image ID is extracted and recorded in the image feature table, and the current time is recorded as the modification time. This situation often occurs for newly added images. For example, at 210 of FIG. 2B, the image ID is recorded in the image update table as mentioned previously. However, the Image ID has not yet included in the image feature table. Therefore, before the image feature extraction steps above, the image ID is recorded in the image feature table, but there exists no modification time associated with the image ID in the Image Feature Table.

Similarly, if the modification time in the image feature table is earlier than that in the image update table, then the value of the characteristic vector value of the image corresponding to the image ID is also extracted and updated in the image feature table, and the current time is recorded as the modification time.

If the modification time in the image feature table is the same or later than that in the image update table, no action is taken.

By way of example, the modification time corresponding to image A1 in TABLE 2 is 18:00:00 PM, Jan. 1, 2009. The modification time corresponding to image A1 in TABLE 3 is 17:0:00 PM, Jan. 1, 2009, which is earlier than the modification time in TABLE 2. It indicates that the image having image ID A1 is updated after the image is stored in the image database, and image A1's feature in TABLE 3 is outdated. Therefore, the characteristic vector of the updated image is extracted and stored in the image feature table and the modification time of A1 is updated to a current time, for example, 18:10:00 PM, Jan. 1, 2009. The image feature table after being updated is illustrated in TABLE 4.

TABLE 4

Image Feature Table after Update

| Image ID | Image Feature | Modification time |
|---|---|---|
| A1 | (P11', P12', ..., P1n') | 2009-1-1 18:10:00 |
| A2 | (P21, P22, ..., P2n) | 2009-1-1 18:00:00 |
| ... | ... | ... |

The process above ensures that the updated image IDs, last recorded modification time, and updated image features are all up-to-date in the image feature table.

At 230 of FIG. 2B, the extracted features of the updated image are associated with a search engine. In some embodiments, associating the image features with a search engine is to "BUILD" the updated images into the search engine, i.e, creating an index for the extracted image features in the search engine and storing the index into a memory. In one embodiment, an array is created in the index for the extracted features of each image. Since the features of each image may include a vector with multiple dimensions, an array is used for storing the plurality of values of the dimensions.

If the search engine is distributed, an embodiment of the method may further include distributing the extracted image features of the updated images to each of the autonomous sub-systems of the distributed search engine.

As can be seen from the various aforementioned embodiments, to update images in an image database, the updated images are obtained; then, the features of the updated images are extracted and stored; and finally, the extracted image features of the updated images are associated with a search engine. Only the updated images, i.e, newly added or modified images, are involved in the entire process rather than all the images in the entire database. Therefore, in comparison with the conventional techniques, the time required for extracting the image features of images in the image database and the time required for associating the image features with the search engine are greatly reduced. That leads to improved efficiency for updating an image database.

The implementations of embodiments of systems for updating image databases are described below. The systems are described to include a number of modules/units, which in turn may include sub-units. The modules/units can be implemented as software components executing on one or more processors, as hardware such as programmable logic devices and/or Application Specific Integrated Circuits designed to perform certain functions or combinations thereof. In some embodiments, the modules/units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules/units may be implemented on a single device or distributed across multiple devices. The functions of the modules/units may be merged into one another or further split into multiple sub-modules/sub-units.

Figure 3:
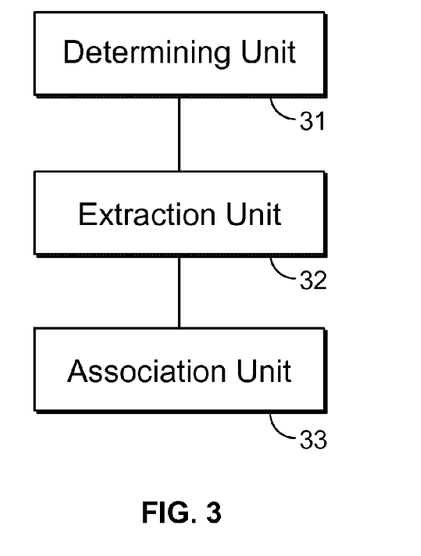
FIG. 3 is a block diagram illustrating an embodiment of a server in an image updating system.

FIG. 3 is a block diagram illustrating an embodiment of a server in an image updating system. The server includes: a determining module 31, which is adapted to determine only updated images; an extraction module 32, which is adapted to extract a feature of the updated images and store the characteristic vectors representing the features of those images; and an association module 33, which is adapted to associate the extracted image features of the updated images with a search engine.

In some embodiments, the determining module 31 may determine the updated image through an updated image ID in an image update table. The image update table may be stored in a storage unit of the server, for instance, a server 252 shown in FIG. 2A or some other devices outside of the server.

Figure 4:
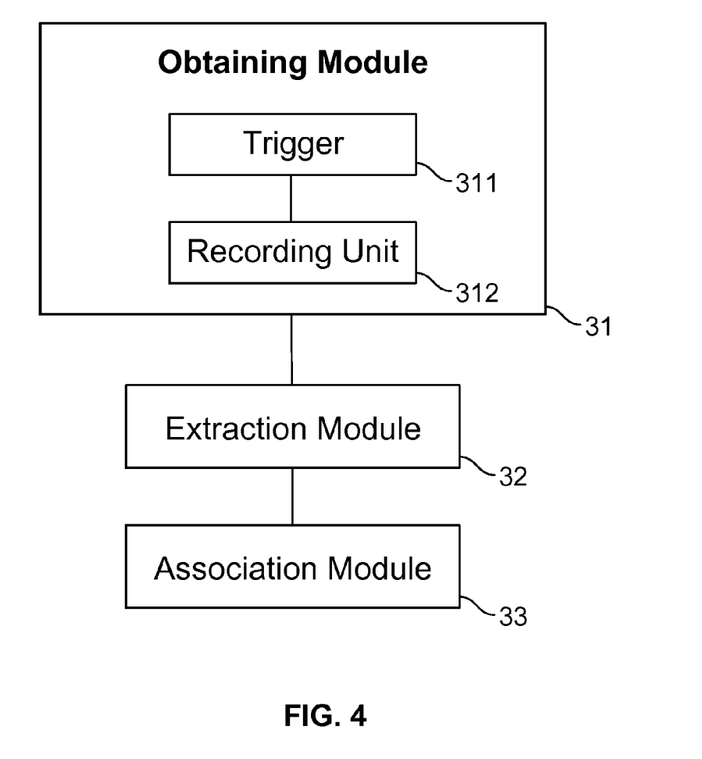
FIG. 4 is a block diagram illustrating an alternative embodiment of a server in an image updating system.

In some other embodiments, the determining module 31 may further include: a trigger unit 311 and a recording unit 312, as illustrated in FIG. 4. The trigger unit 311 is adapted to detect whether an image in the image database was modified; and the recording unit 312 is adapted to record an image ID of the updated image if the trigger unit detects an occurrence of an UPDATE command along with image updating operations in the image database. One skilled in the art should understand that the relationships of different units as illustrated in FIG. 4 are merely an example of a server in the present application. Alternatively, the recording unit 312 and the trigger unit 311 in FIG. 4 may be in another device outside of the server. This depends on which device is responsible for the operation of the image database.

Figure 5:
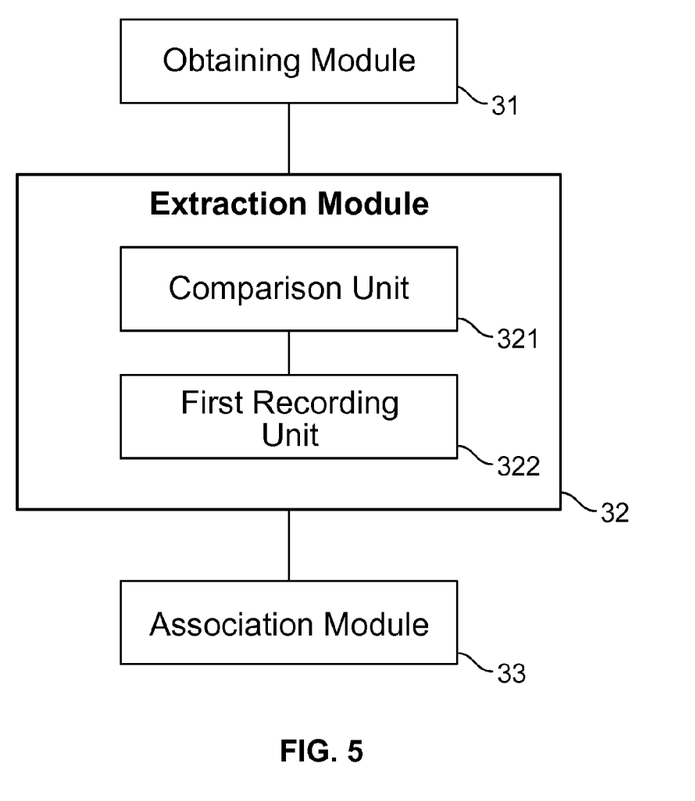
FIG. 5 is a block diagram illustrating an alternative embodiment of a server in an image updating system.

In some embodiments as illustrated in FIG. 5, the extraction module 32 may further include: a comparison unit 321, which is adapted to compare the modification time corresponding to an image ID in an image update table with the modification time corresponding to the same image ID in an image feature table according to a predetermined schedule; and a first recording unit 322, which is adapted to extract the features of an image corresponding to its image ID if the image feature table does not contain a modification time, then record the feature in an image feature table and use the current time as the modification time.

Figure 6:
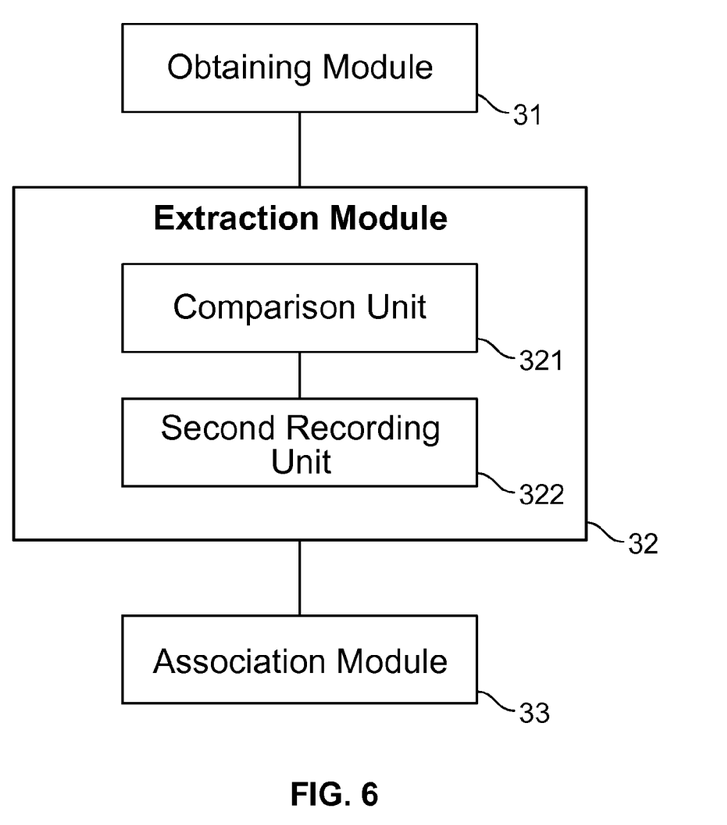
FIG. 6 is a block diagram illustrating an alternative embodiment of a server in an image updating system.

In some embodiments as illustrated in FIG. 6, the extraction module 32 may further include: a comparison unit 321, which is adapted to compare the modification time corresponding to an image ID in an image update table with an the modification time corresponding to the same image ID in an image feature table according to a preset schedule; and a second recording unit 323, which is adapted to extract the feature of an image corresponding to its image ID if the modification time in the image feature table is earlier than that in the image update table, and update the image feature in the image feature table and use the current time as the modification time.

Figure 7:
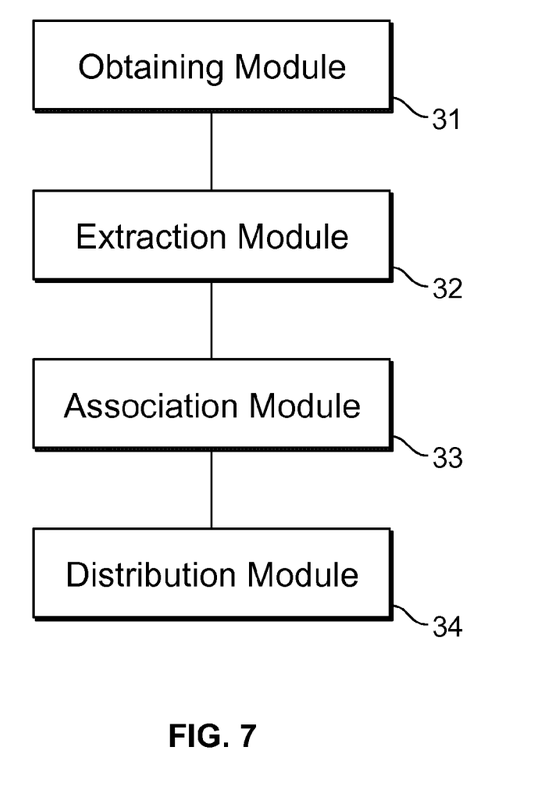
FIG. 7 is a block diagram illustrating an alternative embodiment of a server in an image updating system.

In some embodiments as illustrated in FIG. 7, if the search engine is distributed, the server may further include: a distribution module 34, which is adapted to distribute the image features of the updated images to the distributed search engine.

Figure 8:
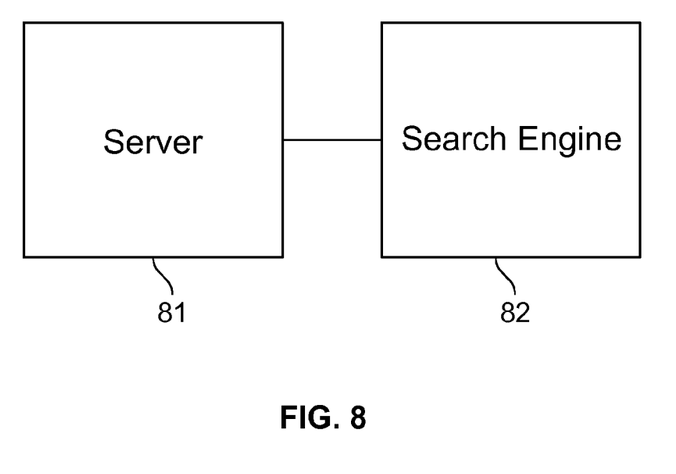
FIG. 8 is a block diagram illustrating an embodiment of a system for updating images in an image database.

FIG. 8 illustrates an embodiment of a system for updating images in an image database according to the present application. The system includes a server 81 and an search engine 82; the server 81 may be an embodiment of any one of the servers in FIG. 3-FIG. 7; and the search engine 82 is adapted to associate with the features of updated images extracted by the server 81.

Figure 9:
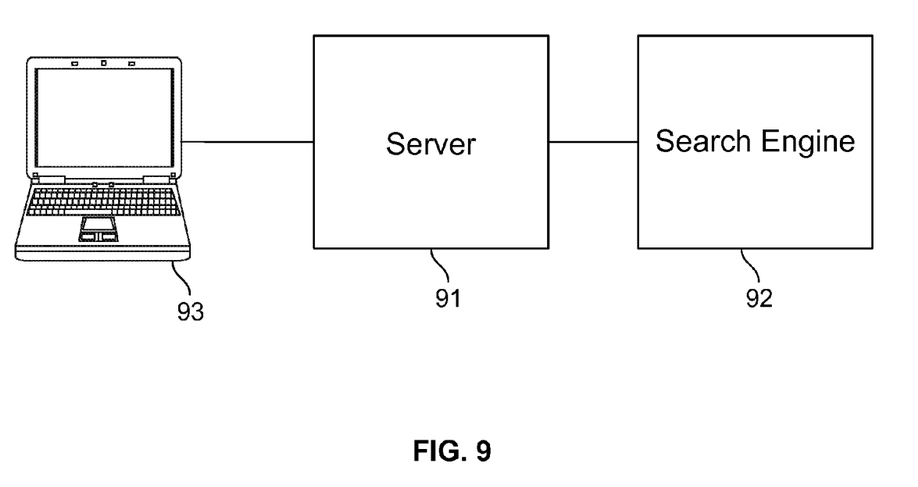
FIG. 9 is a block diagram illustrating an alternative embodiment of a system for updating images in an image database.

FIG. 9 illustrates an alternative embodiment of a system for updating images in an image database. The system includes a server 91, a user terminal 93 and a search engine 92. The user terminal 93 is adapted to upload images to the server 91 through the Internet; the server 91 may be any one of the servers in FIG. 3-FIG. 7 and is adapted to receive the images uploaded by the user terminal 93 and store the images; and a search engine 92 is adapted to associate with the features of the updated images extracted by the server 91.

Figure 10:
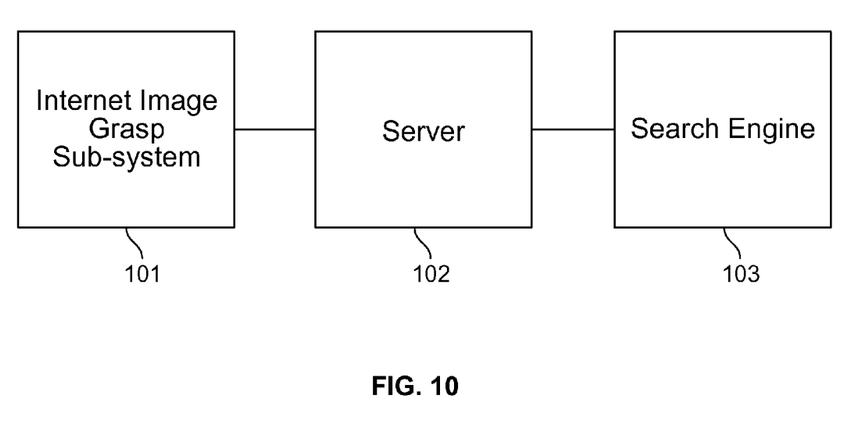
FIG. 10 is a block diagram illustrating an alternative embodiment system for updating images in an image database.

FIG. 10 illustrates another embodiment of a system for updating images in an image database. The system includes a server 101, an Internet image retrieval sub-system 103, and a search engine 102. The Internet image retrieval sub-system 103 is adapted to retrieve an image over the Internet and transmit the image to the server 101. The Internet image retrieval sub-system 103 may an Internet crawler. The server 101 may be any one of the servers in FIG. 3-FIG. 7 and is adapted to receive the image retrieved by the Internet image retrieval sub-system 103 and store the image; and the search engine 102 is adapted to associate with the features of the updated images extracted by the server 101. One skilled in the art should understand that the relationships of different units as illustrated in FIG. 10 are merely an example of the system of the present application. Alternatively, the Internet image retrieval sub-system 103 in FIG. 10 may be integrated into the server 101 or the search engine 102.

For easy description, the above system is divided into, according to functions, various modules, or units, which are described respectively. However, the function of each module or unit may be implemented in one or more software and/or hardware during the practice of the present application.

One skilled in the art should understand that the embodiments of this application may be provided as a method, a system, or a computer product. Therefore, this application may be in the form of full hardware embodiments, full software embodiments, or a combination thereof. Moreover, this application may be in the form of a computer program product that is implemented on one or more computer-usable storage media (including, without limitation, magnetic disk storage, CD-ROM and optical storage) containing computer-usable program codes.

The respective embodiments of the present application are described one by one, the same and similar parts of the embodiments are made by reference, and in each embodiment is emphasized the difference from other embodiments. Specifically, the system embodiments are described briefly due to similarity to the method embodiments, and relevant parts of the system embodiments are made with reference to the method embodiments.

The present application may be applied to many universal or dedicated computing system environments or configurations, for example, a personal computer, a server computer, a handset or a portable device, a flat panel device, a multi-processor system, a microprocessor-based system, a set top box, a programmable consumer electric device, a network PC, a minicomputer, a large scale computer, a distributed computing system including any one of the above system or device, etc.

This application is described referring to the flow chart and/or block diagram of the method, system, and computer program product according to the embodiments of this application. It should be understood that each flow and/or block in the flow chart and/or block diagram and the combination of flow and/or block in the flow chart and/or block diagram may be realized in computer program instruction. In fact, the entire application may be described in a general context of a computer executable instruction that is executed by a computer, for example, a program module. Generally, the program module includes routines, programs, objects, components, data structures, etc. for executing a specified task or implementing a specified abstract data type. Alternatively, the present invention may be implemented in a distributed computing environment, where a remote processing device connected through a communication network executes the task. In the distributed computing environment, the program module may be located in a local or remote computer storage medium which includes a storage device.

Although the present invention is described through the embodiments, those ordinary skilled in the art shall understand that there are assorted variations and modifications without departing from the spirit of the present invention. Accordingly, if these modification and variation to the present invention fall within the scope of the claims of the present invention and their equivalents, the present invention intends to include all modifications and variations.

What is claimed is:

1. A method for updating an image database, comprising:
    detecting, using a processor, an update to an image that is among a plurality of existing images in the image database;
    determining an updated image corresponding to the detected update;
    extracting a plurality of image features of the updated image and storing a plurality of image feature values that correspond to the plurality of image features, wherein extracting the image features of the updated image includes:
        determining whether an image feature table includes a modification time of the updated image;
        in the event that the image feature table does not include the modification time of the image, recording a current time as the modification time in the image feature table; and
        in the event that the image feature table includes the modification time of the image:
            comparing the modification time corresponding to an image identifier of the updated image in an image update table and the image feature table according to a preset schedule; and
            recording the plurality of image features in the image feature table; and
    associating the plurality of image features of the updated image with a search engine, including adding an array comprising the plurality of image feature values to an index of the search engine.

2. The method of claim 1, wherein determining the updated image includes recording the image identifier of the updated image in the image update table.

3. The method of claim 1, wherein detecting an update includes:
    creating a trigger configured to detect an image update in the image database;
    setting off the trigger in the event that an UPDATE command is detected in the image database; and
    recording the image identifier of the updated image in the image update table.

4. The method of claim 1, further comprising:
    recording in the image feature table an image identifier that exists in the image update table but does not exist in the image feature table.

5. The method of claim 1, wherein extracting the image feature of the updated image comprises:
    comparing the modification time corresponding to the same image identifier in the image update table and the image feature table according to the preset schedule; and
    extracting the feature of the image corresponding to the image identifier, recording the image feature in the image feature table, and updating the current time as the modification time if the modification time in the image feature table is earlier than the modification time in the image update table.

6. The method of claim 1, further comprising:
    distributing the plurality of image features of the updated image to a distributed search engine.

7. An image updating system, comprising:
    an interface to an image database;
    one or more processors coupled to the interface, configured to:
        detect an update to an image that is among a plurality of existing images in an image database;
        determine an updated image corresponding to the detected update;
        extract an image feature of the updated image and storing the image features, wherein extract the image features of the updated image includes:
            determine whether an image feature table includes a modification time of the updated image;
            in the event that the image feature table does not include the modification time of the image, record a current time as the modification time in the image feature table; and
            in the event that the image feature table includes the modification time of the image:
                compare the modification time corresponding to an image identifier of the updated image in an image update table and the image feature table according to a preset schedule; and
                record the plurality of image features in the image feature table; and
        associate the plurality of image features of the updated image with a search engine;
    one or more memories coupled to the one or more processors, configured to provide the processors with instructions.

8. The system of claim 7, wherein determining the updated image includes recording the image identifier of the updated image in the image update table.

9. The system of claim 7, wherein detecting an update includes:
    creating a trigger configured to detect an image update in the image database;
    setting off the trigger in the event that an UPDATE command is detected in the image database; and
    recording the image identifier of the updated image in the image update table.

10. The system of claim 7, further comprising:
    recording in the image feature table the image identifier that exists in the image update table but does not exist in the image feature table.

11. The system of claim 7, wherein extracting the image feature of the updated image comprises:
    comparing the modification time corresponding to the same image identifier in the image update table and an image feature table according to the preset schedule; and
    extracting the feature of the image corresponding to the image identifier, recording the image feature in the image feature table, and updating the current time as the modification time if the modification time in the image feature table is earlier than the modification time in the image update table.

12. The system of claim 7, further comprising:
    distributing the plurality of image features of the updated image to a distributed search engine.

13. A computer program product for updating an image database, the computer program product being embodied in a computer readable storage medium and comprising computer instructions for:
    detecting, using a processor, an update to an image that is among a plurality of existing images in the image database;
    determining an updated image corresponding to the detected update;

determining an updated image that is among a plurality of images in the image database;

extracting a plurality of image features of the updated image and storing a plurality of image feature values that correspond to the plurality of image features, wherein extracting the image features of the updated image includes:

determining whether an image feature table includes a modification time of the updated image;

in the event that the image feature table does not include the modification time of the image, recording a current time as the modification time in the image feature table; and in the event that the image feature table includes the modification time of the image:

comparing the modification time corresponding to an image identifier of the updated image in an image update table and the image feature table according to a preset schedule; and recording the plurality of image features in the image feature table; and associating the plurality of image features of the updated image with a search engine, including adding an array comprising the plurality of image feature values to an index of the search engine.

14. The method of claim 1, wherein the recording of the plurality of image features includes:

in the event that the modification time corresponding to the image identifier of the updated image in the image update table and the image feature table is the same, performing no action.

* * * * *